United States Patent [19]

Gravelle

[11] Patent Number: 4,952,346
[45] Date of Patent: Aug. 28, 1990

[54] PROCESS FOR INDUCTION HEATING OF MELT-OUT CORES

[75] Inventor: Kelly P. Gravelle, Ile Bizard, Canada

[73] Assignee: Electrovert Ltd, Toronto, Canada

[21] Appl. No.: 268,552

[22] Filed: Nov. 8, 1988

[51] Int. Cl.[5] .................... B29C 35/14; B29C 41/46; B29C 71/04
[52] U.S. Cl. .................... 264/25; 264/317; 425/174.8 R
[58] Field of Search ............ 264/317, 22, 25, 26, 264/27, 275; 425/174.8 R

[56] References Cited

U.S. PATENT DOCUMENTS

| | | | |
|---|---|---|---|
| 3,640,657 | 2/1972 | Rowe | 425/174.8 R |
| 3,882,220 | 5/1975 | Ryder | 264/317 |
| 3,957,382 | 5/1976 | Grevel | 264/317 |
| 4,464,324 | 8/1984 | Hager | 264/317 |
| 4,676,296 | 6/1987 | Pascoe et al. | 164/303 |

FOREIGN PATENT DOCUMENTS 1085842 4/1984 U.S.S.R. .................... 425/174.8 R

*Primary Examiner*—Jay H. Woo
*Assistant Examiner*—Jeremiah F. Durkin, II
*Attorney, Agent, or Firm*—Darby & Darby

[57] ABSTRACT

A process for induction heating of melt-out metal cores contained within articles or components made of plastic. The process uses induction heating and redirects flux lines for efficient melting. A high permeability magnetic core is heated by an induction heating coil about at least a portion of the magnetic core to produce flux circulation in a magnetic circuit formed by the magnetic core. Two magnetic nozzles are attached to the magnetic core with a gap therebetween for insertion of a specific shape of plastic article, the magnetic nozzles being shaped to direct and position a desired pattern of flux lines to heat and melt the metal core of the plastic article.

4 Claims, 1 Drawing Sheet

PROCESS FOR INDUCTION HEATING OF MELT-OUT CORES

FIELD OF THE INVENTION

The present invention relates to the melting of metal cores contained within articles or components made of plastic by means of induction heating. More specifically, the present invention provides for the positioning or redirecting of flux lines for efficient melting of metal cores around which plastic articles or components have been molded.

DESCRIPTION OF THE RELATED

Fusible metal cores having a complex shape provide a detailed internal configuration for a molded plastic article or components. These components are used in the automobile industry and other industries in place of metal components and to avoid the necessity of machining. The metal cores are made of a low melting point alloy that are subsequently removed from the work piece by melting. The plastic material of the article or component is not damaged by or deformed when heated to the melting temperature of the metal alloy for melting the metal cores.

Induction heating coils have been used for melting metal cores. However, in the past, the coils have to be designed and manufactured for each specific application. Coupling of magnetic flux into the work piece containing the metal core has been limited by the physical constraints of winding a coil about a work piece. The term "work piece" used herein includes the plastic article or component with the fusible metal core therein. Most of these articles or components have unusual geometries and are surrounded by plastic material which inhibits placing the coil conductors in close proximity with the fusible metal core.

It has been found that by utilizing a magnetic core made of a material with a high permeability, and utilizing a coil around a portion of the magnetic core, then a far better coupling between the coil and the magnetic core is obtained than when a coil is used with a non-magnetic work piece. A single coil may be employed about a magnetic core, and the core produces a magnetic circuit that may be applied to many different shapes of work pieces thus eliminating the need for a separate coil design for each different shape of work piece. Furthermore, magnetic nozzles of different shapes may be placed in a gap in the magnetic core to position or adjust flux lines to suit different shapes of work pieces. The work piece is positioned between the nozzles to provide easy access as the work piece does not have to be surrounded by a tightly coupled coil. The nozzles may be hinged or removable (if required) so that robotic insertion of the work piece into the gap between the nozzles may be achieved thus making the insertion and removal of the article or component simpler.

SUMMARY OF THE INVENTION

The present invention provides a process of melting metal cores from molded plastic articles comprising the steps of, positioning at least one plastic article in a gap between two magnetic nozzles attached to a high permeability magnetic core so that the article remains within a magnetic circuit of the magnetic core, the nozzles shaped to direct and position a desired pattern of flux lines for a specific shape of plastic article, and inducing eddy currents in a metal core of a molded plastic article to heat and melt the metal core.

The present invention also provides an induction heating system for melting of metal cores from molded plastic articles comprising, a high permeability magnetic core, an induction heating coil about at least a portion of the magnetic core to produce flux circulation in a magnetic circuit formed by the magnetic core, and two magnetic nozzles attached to the magnetic core, with a gap therebetween for insertion of a specific shape of plastic article, the magnetic nozzles shaped to direct and position a desired pattern of flux lines to heat and melt the metal core of the plastic article.

BRIEF DESCRIPTION OF THE DRAWINGS

In drawings which illustrate the embodiments of the invention.

DESCRIPTION OF THE PREFERRED EMBODIMENTS

Figure 1:
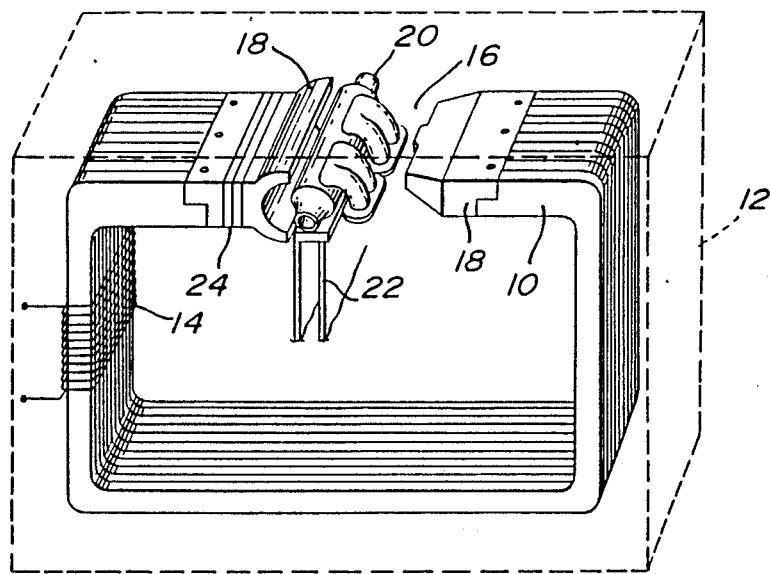
FIG. 1 is an isometric view of a magnetic core according to one embodiment of the present invention showing a work piece positioned in a gap between two magnetic nozzles.

Referring now to the drawings, FIG. 1 shows a magnetic core 10 positioned in a tank 12 filled with a heating liquid, preferably oil. The liquid in the tank 12 is heated by means not shown herein and preferably kept at a temperature slightly above the melting temperature of the metal core to be melted from within the plastic article. The magnetic core 10 has high permeability and is preferably made of laminated magnetic steel or, alternatively, of machinable ferrite to ensure flux circulation around the magnetic circuit formed by the magnetic core 10. An induction heating coil 14 is shown wrapped around one portion of the magnetic core 10 to couple the flux from the coil 14 to the magnetic core 10 and direct flux lines about the magnetic core 10. A gap 16 is provided at the top of the magnetic core 10 which has two magnetic nozzles 18, one on each side of the gap 16 attached to the ends of the magnetic core 10. The space between the nozzles 18 contains the work piece 20 and provision is made to retain the work piece 20 within the gap 16 by a non-magnetic work holder 22 (preferably made of plastic). The magnetic nozzles 18 are sometimes referred to as flux concentrators to the extent that they are shaped to achieve the desired flux pattern passing through the work piece 20. In effect, the magnetic nozzles direct and position the flux lines so the eddy current heating of the metal core in the work piece 20 is as efficient as possible, and little or no loss of heat by hysteresis occurs. Smaller work pieces would require the nozzles 18 to reduce the area from the ends of the core 10 to match the size of the work piece 20. The flux nozzles 18 are preferably made of machinable ferrite, laminated magnetic steel or other suitable high permeability material. A non-magnetic shim 24 is shown between one end of the core 10 and the flux nozzle 18. Such a shim 24 which may be made of laminated aluminum or high temperature thermoplastic material can be used to adjust inductance within the magnetic circuit, and can be located at one or both ends of the core 10.

The air gap 16 between the nozzles 18 linearizes the system and virtually eliminates hysteresis loss in the system. The laminated magnetic steel or machinable ferrite, from which the core 10 is made, is resistant to the flow of eddy currents, thus any eddy current losses in the magnetic circuit is minimal and any losses which do occur serve to heat the oil tank 12.

Figure 2:
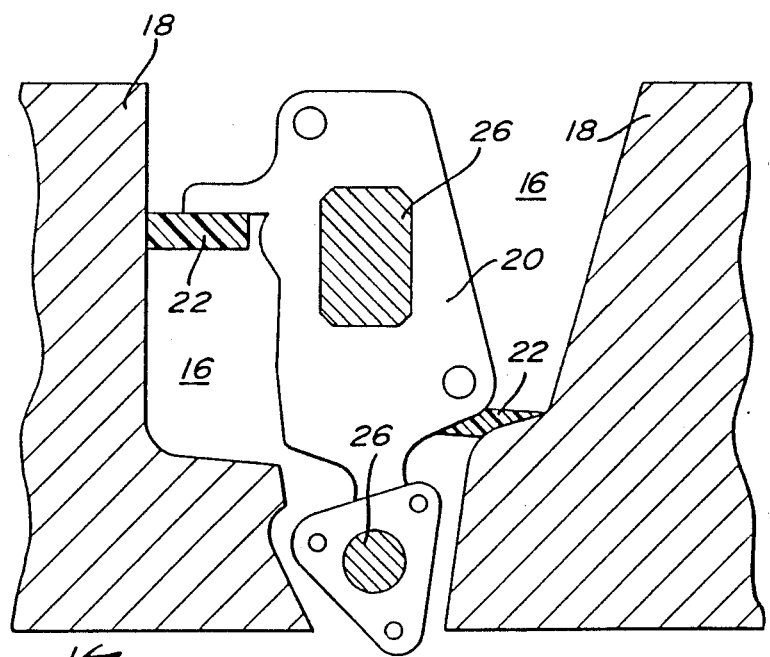
FIG. 2 is a detailed sectional view through a gap in a magnetic core showing two nozzles contoured to fit a specific work piece.

FIG. 2 illustrates a particular shape of work piece 20 with nozzles 18 contoured to fit the work piece 20. In this instance the nozzles 18 are made to be hinged or removable from the core 10, but have good contact with the ends of the core 10, thus different shaped nozzles 18 may be placed in the gap between the ends of the core loop 10 to suit different shapes of work pieces 20.

The work piece 20 is supported by work holders 22 made of non-magnetic material such as thermoplastics, and the flux nozzle profile is designed to melt the cores 26 from the plastic article forming the work piece 20. The cores 26 melt from the bottom up so the molten metal drops to the bottom of the oil tank. The location of the work piece in the air gap 16 is not critical. The removable nozzles 18 are tailored to the work piece and are easily changed when a different shape of work piece is to be processed.

In situations where heating is not desired, for instance, where a specific component of a work piece is not to be heated, then copper or other suitable shield material is used at a specific location on the work piece 20 or in the nozzle itself to prevent flux lines passing through that specific location and heating the area.

In operation, the work piece 20 is placed between the nozzles 18, either by an automatic robot system or other suitable insertion system, power is turned on to the heating coil 14 so that flux circulates around the core loop 10 and through the work piece 20. Induction heating or eddy current heating as it is sometimes called does not directly heat the plastic material, but heats the metal core. General heating times are in the order of thirty seconds to one minute, the metal core then melts and drains from the plastic article 20. The heating times can be varied by the power input to the electrical heating coil 14 and also by changing the frequency of the electrical power. Because the heating occurs quickly, and by induction heating the plastic material, which is not affected by the induction heating, does not have a chance to heat up, thus the temperature of the metal core is quickly heated and drains away before the temperature of the plastic work piece reaches the melting temperature of the metal core or indeed the temperature of the liquid within the bath 12.

The temperature from the eddy current heating can be varied by varying the number of coils in the heating coil 14 to change the inductance. The air gap 16 between the nozzles 18 can be changed or, alternatively, a gap may be provided between the nozzles 18 and the end of the magnetic core 10. Such an adjustment affects the heat output from the magnetic circuit. The nozzle thickness may vary in thickness to five times the flux lines for a specific size or shape of work piece. Use of non-magnetic shims, such as laminated aluminum, high temperature thermoplastic materials or other suitable non-magnetic materials may be used between the nozzles 18 and the ends of the magnetic core 10 to adjust inductance within the magnetic circuit.

Heating times are greatly reduced by utilizing induction heating as if the work piece had to be heated in a hot oil bath, then heating times can be between 10 to 20 minutes. The efficiency of the system is improved because flux is more efficiently directed to the workpiece rather than wasted in the surrounding environment, thus less current is required to achieve the same flux density through the core. This results in reduced copper losses (IR losses) occurring in the heating coil. Furthermore, less current is required to generate the same flux due to the high permeability of the core, which also reduces copper losses in the heating coil.

Various changes may be made to the embodiments described herein without departing from the scope of the present invention Which is limited only by the following claims.

The embodiments of the invention in which an exclusive property or privilege is claimed are defined as follows.

1. A process of melting a metal core from a molded plastic article placed in a hot liquid bath wherein the metal core is made of a low melting point alloy which has a melting temperature below the melting temperature of said plastic article comprising the steps of:

positioning at least one plastic article in the hot liquid bath in a gap between two magnetic nozzles attached to a high permeability magnetic core, so the article remains within a magnetic circuit of the magnetic core, the nozzles shaped to direct and position a desired pattern of flux lines for a specific shape of plastic article, and inducing eddy currents in a metal core of the molded plastic article to heat and melt the metal core.

2. The process according to claim 1 wherein the hot liquid bath is maintained at a temperature slightly above melt temperature of the metal core.

3. The process according to claim 1, including the step of controlling the temperature of heating by varying the electrical power and frequency into a heating coil about a portion of a magnetic core loop.

4. The process according to claim 1, including the step of controlling the temperature of heating by changing the magnetic nozzle configuration and the gap between the two nozzles.

* * * * *